United States Patent [19]

Schoennahl et al.

[11] Patent Number: 5,215,947
[45] Date of Patent: Jun. 1, 1993

[54] REFRACTORY PARTS FOR DEVICES FOR REGULATION OR INTERRUPTION OF A JET OF STEEL, MADE OF REFRACTORY MATERIAL

[75] Inventors: Jacques P. R. Schoennahl, Villeurbanne; Daniel Kuster, Lyons, both of France

[73] Assignee: Savoie Refractaires, France

[21] Appl. No.: 944,753

[22] Filed: Sep. 14, 1992

Related U.S. Application Data

[63] Continuation of Ser. No. 769,394, Oct. 1, 1991, abandoned.

[30] Foreign Application Priority Data

Oct. 11, 1990 [FR] France .................. 90 12545

[51] Int. Cl.[5] ............................ C04B 35/58
[52] U.S. Cl. ........................ 501/98; 501/97; 501/128
[58] Field of Search .................. 501/97, 98, 128

[56] References Cited

U.S. PATENT DOCUMENTS 3,991,148 11/1976 Lumby et al. .................. 501/98
4,533,646 8/1985 Wang et al. .
4,870,037 9/1989 Hoggard et al. .................. 501/98

FOREIGN PATENT DOCUMENTS 0317980   5/1989  European Pat. Off. .
3320016  12/1983  Fed. Rep. of Germany .
3500422   9/1985  Fed. Rep. of Germany .
 263750  11/1989  German Democratic Rep. .
1068374   4/1976  Japan .................. 501/98
0129873   8/1982  Japan .................. 501/98
0020782   2/1983  Japan .................. 501/97
WO90/02822 3/1990 PCT Int'l Appl. .
0619680  10/1980  Switzerland .................. 501/97
2075965  11/1981  United Kingdom .

Primary Examiner—Mark L. Bell
Assistant Examiner—Paul Marcantoni
Attorney, Agent, or Firm—Stevens, Davis, Miller & Mosher

[57] ABSTRACT

The invention relates to a refractory part for a device for regulation or interruption of a jet of steel, characterized in that it is formed from a refractory material essentially consisting of a) 61 to 77% by weight of grains having an alumina content of more than 50% by weight and a melting point higher than 1800° C., and
b) 39 to 23% by weight of a binding phase having a X-ray diagram in which the most intense lines are the lines characteristic of a sialon of the formula $Si_{6-z}Al_zN_{8-z}$ where z ranges from 2.5 to 4.

Application in particular as plate in a slide closing device.

10 Claims, No Drawings

REFRACTORY PARTS FOR DEVICES FOR REGULATION OR INTERRUPTION OF A JET OF STEEL, MADE OF REFRACTORY MATERIAL

This application is a Continuation of application Ser. No. 07/769,394, filed Oct. 1, 1991, and abandoned Oct. 14, 1992.

In steel making plants, the control of metal casting makes use of well-known devices for regulating or interrupting the jet, that is to say:

calibrated nozzles for free jet casting, the plug and nozzle system, and the slide closing system, typically comprising a seating brick, an internal nozzle, a fixed plate, a mobile plate and a collecting nozzle.

The parts which make up these devices and which are in contact with the molten metal must be produced from high performance refractory materials. In fact, in order to obtain a sufficient lifetime and not to put the installations and personnel at risk as a result of accidental break, these materials must have the following characteristics:

very high mechanical strength at high temperature, excellent resistance to corrosion by steel, good resistance to thermal shocks, and low thermal conductivity, in order to prevent plugging as a result of solidification of the metal when the jet is momentarily interrupted. This conductivity must preferably be lower than about 5 W/m.K at 800° C., a low coefficient of expansion, that is to say below about $9 \times 10^{-6}$ $K^{-1}$. This property is important because in applications such as slide closing plates the parts are hooped in mechanical assemblies and deformations associated with steep heat gradients must be avoided.

In the case of slide closing systems, two types of refractory materials are commonly used at present to produce the plates:

materials based on high purity magnesia, pressed and fired at high temperature, and materials formed from mullite-bonded corundum—pressed and fired at high temperature.

Table I below gives the main characteristics of two typical products commonly used at present.

The resistance to thermal shocks or variations was determined by measuring the reduction in the cold modulus of rupture obtained on $125 \times 25 \times 25$ mm bars subjected to the following treatment:

sudden introduction of testpieces into a furnace heated at 1200° C., holding for 30 min, followed by quenching of the testpieces in cold water.

The resistance to corrosion was determined by the dynamic method known as "rotary fingers". Four testpieces, cut in bar form, are fixed in a circle on a support provided with a rotary movement about a vertical axis. At least one of the testpieces serves as reference.

The attacking agent, for example steel or a molten slag, is placed in a refractory crucible and brought to a temperature higher than its melting point. When the test temperature is reached, the support carrying the testpieces is lowered so as to immerse the lower end of the testpieces in the attacking agent for a predetermined time. At the end of the test, the support carrying the testpieces is raised so as to extract the testpieces from the molten attacking agent before the latter solidifies. After cooling, the loss in thickness of the testpieces is determined.

The results of this test, recorded in Table I, were obtained using, as attacking agent, a XC 30 steel at 1700° C. under an argon atmosphere. The holding time for the testpieces in the molten steel was 4 hours and the rotational speed of the support carrying the testpieces corresponded to a linear speed of 2.4 cm/s for the testpieces.

Depending on the specific conditions of use and the nature of the steel, and especially the choice of refining agent and method, iron and steel metallurgists are currently able to choose between plates based on magnesia or based on corundum containing a mullite binder.

Magnesia plates are reputed to be more resistant to corrosion, but they are sensitive to thermal shocks and their high thermal conductivity promotes plugging of the casting devices in the restriction zones, by solidification of the metal or of a layer of slag.

In numerous cases, the steels are refined by addition of powerful reducing elements, such as aluminium and calcium, with a view to deoxidize them.

These additives, which are present in excess, are able to attack the easily reducible components of the refractory material, such as silica (in the case of materials based on mullite-bonded corundum,—if such materials are present. It is therefore important to have available refractory materials which are difficult to reduce by aluminium and calcium.

Moreover, materials are known which comprise a silicon carbide granulate and a binding matrix based on silicon nitride or sialon. These materials are in common use for the refractory lining of blast furnaces and the production of firing supports for the ceramics industry. These materials are well known for their excellent mechanical strength at elevated temperature and their excellent resistance to thermal shocks, but are nevertheless unsuitable for the applications under consideration here because their resistance to corrosion by steel is mediocre and their thermal conductivity is too high.

EP-A-0,317,980 also discloses refractory materials formed from grains based on alumina bonded by a binder formed from silicon oxynitride and sialon, in which the characteristic lines of sialon are more intense than those characteristic of silicon oxynitride, the latter, however, representing a substantial minor constituent. These materials are recommended for the production of kiln equipment, as refractory structural materials and for the production of vessels intended to contain molten aluminium. It is not suggested that these materials could be used for the production of refractory parts which are components of a device for the regulation or interruption of a jet of steel, that is to say liable to operate at a temperature higher than 1540° C. and in contact with molten steel.

It is therefore surprisingly that the Applicant has found that the materials of the type of those described above are particularly suitable for the production of refractory parts which are components of a device for regulation or interruption of a jet of steel.

The invention therefore relates to refractory parts for devices for regulation or interruption of a jet of steel, characterised in that they are formed from a refractory material essentially consisting of a) 61 to 77% by weight of oxide-based grains, having an alumina content of at least 50% by weight and a melting point higher than 1800° C., and b) 39 to 23% by weight of a binding matrix having a X-ray diagram in which the most intense lines are the lines characteristic of a sialon of the formula $Si_{6-z}Al_zO_zN_{8-z}$ where z ranges from 2.5 to 4 and preferably from 2.5 to 3.5.

The oxide-based grains having an alumina content of at least 50% by weight, may be, for example, corundum grains spinel (MgO—$Al_2O_3$) grains, grains of the mullite-zirconia type or grains of the corundum-spinel type.

The choice of a particular grain will depend on the particular application envisaged. It has been found that grains containing more than 90% by weight of alumina, such as corundum grains, are very suitable for the production of the plates of slide closing systems, or the components of plug and nozzle systems. Grains containing at least 70% of alumina, such as spinel (MgO—$Al_2O_3$) grains, are very suitable for the production of calibrated nozzles. Fused grains of mullite-zirconia give materials having high resistance to corrosion by iron oxide and are very suitable for the production of the internal nozzles in slide closing systems. Fused particles of corundum-spinel permit materials to be obtained which offer a good compromise between the resistance to corrosion by iron oxide and the resistance to erosion and to thermal shocks and are useful for the production of collecting nozzles in slide closing systems.

The binding matrix will also contain, as is inevitable for this type of composition, one or more minor constituent(s), such as silicon nitride $Si_3N_4$, silicon oxynitride $Si_2ON_2$, nitrogen-containing mullite of composition $Al_6Si_6N_8O_9$, and the 15R polytype of aluminium nitride, the sum of these minor constituents not exceeding about 10% of the binding matrix.

The device for regulating or interrupting the jet of steel may be a plug and nozzle system; a slide closing system, which may comprise a seating brick, an internal nozzle, at least one fixed plate, a mobile plate and a collecting nozzle; a calibrated nozzle for free jet casting from a distributor ladle or an analogous device.

The refractory parts may be, for example, the various parts which are components of a slide closing system, in particular the plates, the orifice of a nozzle and the extreme part of the plug which will be applied against the orifice of the nozzle in a plug and nozzle system, or a calibrated nozzle.

Compared with typical materials based on mullite-bonded corundum—or based on magnesia, which are currently used, the material used in the invention is distinguished by an excellent resistance to thermal shock and an exceptional mechanical strength at elevated temperature. It will also be noted that, in contrast to the product based on mullite-bonded corundum—, it contains only very little silica liable to be chemically attacked by the reducing additives, such as aluminium, which are used to deoxidize—some steels.

Apart from the fact that they have an excellent resistance to corrosion by molten steel on its own, it has been observed that the materials used in the invention have a resistance to corrosion by slags rich in $Fe_2O_3$ which is greater than that of materials which are similar but in which the value of the index for z in the sialon formula indicated above is lower.

The parts of the invention may be produced by a process comprising forming an appropriate mixture based on a granulate of corundum, silicon, alumina, a temporary binder and aluminium, forming this mixture into the desired shape by uniaxial or isostatic pressing, drying the shape obtained and then firing it under nitrogen at a temperature of 1300° to 1600° C., for a period of the order of 4 to 12 hours, depending on the size of the parts. All of the customary finishing operations, such as machining, grinding, impregnation with pitch, etc., which are usually carried out on the refractory parts used in devices for regulating or interrupting a jet of steel, may then be carried out on the part obtained.

The typical composition, in % by weight, of an appropriate starting mixture is given below.

a) 70 to 80% of oxide-based refractory grains which has an alumina content of at least 50% and a melting point higher than 1800° C., and at least 90% of the particles of which are between 5 mm and 20 $\mu$m, b) 20 to 30% of a mixture of reactive powders comprising:
  (i) 35 to 45% of silicon powder, at least 90% of the particles of which have a diameter smaller than 150 $\mu$m;
  (ii) 38 to 50% of calcined alumina, at least 90% of the particles of which have a diameter smaller than 20 $\mu$m;
  (iii) 12 to 20% of aluminium powder, at least 90% of the particles of which have a diameter smaller than 80 $\mu$m, the sum of the constituents (i) to (iii) representing 100%, c) 0 to 3% of a dried and ground refractory clay, the sum of the ingredients (a) to (c) representing 100%, and d) a small amount of a temporary binder.

It is by virtue of the simultaneous presence of the ingredients (i), (ii) and (iii) in the mixture of reactive powders that the formation of $\beta'$-sialon of the formula indicated above in which z=2.5 to 4 can be obtained industrially and economically.

The temporary binder (d) may consist, for example, of an organic resin, such as phenolic resins, furfuryl or polyvinyl alcohols, an aqueous solution of organic polymers such as dextrin, carboxymethyl celluloses, calcium lignosulphonate, etc. Usually, a proportion of 2 to 4% by weight approximately of temporary binder relative to the sum of the ingredients (a) to (c) proves satisfactory.

The role of the clay (c) is to facilitate pressing of the starting mixture.

It will be noted that there is a difference between the content of refractory oxide granulate in the starting mixture and the proportion of identifiable grains in the finished product, since firing is accompanied by a fixation of nitrogen by the metal constituents and therefore by an increase in weight causing the proportion by weight of grains in the finished product to be less than the proportion by weight of granulate in the starting mixture.

The following nonlimiting examples are given with the aim of illustrating the invention.

EXAMPLE 1

A starting mixture formed from the following constituents is prepared:

| | |
|---|---|
| Black corundum 0.2 to 2 mm | 40% by weight |
| Black corundum 20 $\mu$m to 0.2 mm | 31% |
| Silicon powder | 11% |
| Aluminium powder | 5% |
| Calcined fine alumina | 10% |
| Ground clay | 3% |
| | 100% |
| Dextrin powder | —0.5% |

| | -continued |
|---|---|
| Water | +2% | the black corundum is an electrically melted corundum corresponding to the following analysis:

$Al_2O_3 = 96\%$ — $TiO_2 = 3\%$ — $SiO_2 = 0.6\%$ — $Fe_2O_3 = 0.2\%$ — $CaO + MgO + Na_2O + K_2O = 0.2\%$ the silicon powder is marketed by PECHINEY ELECTROMETALLURGIE under the name "Silicium T.140". At least 90% of the particles have a diameter smaller than 150 μm;

the aluminium powder is marketed by PECHINEY ELECTROMETALLURGIE under the name "aluminium 200 TV". At least 90% of the particles have a diameter smaller than 80 μm;

the calcined fine alumina is a commercially available alumina which assays for at least 99.5% $Al_2O_3$ and in which the average particle diameter is about 5 μm, with 90% of the particles between 1 and 20 μm;

the ground clay is marketed by DENAIN-ANZIN-MINERAUX under the name DA.40/42. Its chemical analysis is as follows:

loss on ignition: 12.6% —$Al_2O_3$: 36% —$SiO_2$: 47% —$Fe_2O_3$: 1.8% —$TiO_2$: 1.8% —$CaO + MgO + Na_2 + K_2O$: 0.8%.

This mixture is shaped, in a hydraulic press, into a plate for a slide closing device, by uniaxial pressing under a specific pressure of 1000 bars.

The plate obtained is dried at 150° C. and then fired under nitrogen at 1450° C.

Table I below lists the properties of the material of Example 1, compared with those of two conventional materials.

TABLE 1

| Product type | Mullite-bonded Corundum | Magnesia | Sialon-bonded Corundum (z = 3) |
|---|---|---|---|
| (%) $Al_2O_3$ | 87.5 | — | 65 |
| $SiO_2$ | 7.5 | 0.5 | 0.5 |
| $ZrO_2$ | 4.5 | — | — |
| MgO | — | 97 | — |
| Sialon | — | — | 33.5 |
| Others | 0.5 | 2.5 | 1 |
| Density | 3.15 | 3.07 | 3.14 |
| Flexural strength at 1500° C. (MPa) | 11 | 9 | 30 |
| Coefficient of expansion $10^{-6} K^{-1}$ | 7.1 | 14.4 | 5.2 |
| Coefficient of thermal conductivity at 800° C. (W/mK) | 2.2 | 7.5 | 3.4 |
| Resistance to thermal shock as determined by the reduction in the flexural strength after quenching (%) | −56 | −92 | −47 |
| Resistance to corrosion by steel at 1700° C. Degree of wear (%) | 0 | 0 | 0 |

It is seen that the product formed from—mullite-bonded corundum has a low flexural strength at elevated temperature. Moreover, the $SiO_2$ constituent is liable to be attacked by the deoxidising reducing agents. The product based on magnesia, in turn, has, apart from a low flexural strength at elevated temperature, a mediocre resistance to thermal shock and a high thermal conductivity. In contrast, the product of the invention offers a good compromise of properties (good flexural strength, low thermal conductivity, low coefficient of expansion and good resistance to thermal shock). Plugs and slide closing plates were produced from the composition of Example 1 and tested on a distributor. A lifetime at least 50% longer than that of similar parts produced from corundum materials containing a mullite binder was found.

EXAMPLE 2

Two samples A (outside the scope of the invention) and B (according to the invention) of materials containing a sialon binder and having different values of z were prepared using the method described in Example 1 and their resistance to corrosion by a slag depleted in $Fe_2O_3$ and by a slag rich in $Fe_2O_3$ was determined by the rotary fingers dynamic method described above and their thermal stability was determined by re-firing at very high temperature under argon.

Table 2 below lists the starting ingredients used and the results obtained in the corrosion and thermal stability tests.

TABLE 2

INFLUENCE OF THE INDEX %
ON THE RESISTANCE TO CORROSION
Sialon binder: $Si_{6-z} Al_z O_z N_{8-z}$

| | Material | A | B |
|---|---|---|---|
| Starting Ingredients | Black corundum 2/5 mm | 30 | 30 |
| | Black corundum 0.2/2 mm | 40 | 40 |
| | Black corundum 0.2/0.02 mm | 5 | 4 |
| | Calcined fine alumina | 10 | 10 |
| | Silicon T.140 | 15 | 11 |
| | Aluminium 200 TV | — | 5 |
| | Carboxymethyl cellulose powder | +0.3 | +0.3 |
| | Dextrin powder | +0.5 | +0.5 |
| | Water | +3 | +3 |
| Properties | Value of z in the sialon | 1.3 | 3 |
| | Proportion of binding matrix | 32 | 33 |
| | Corrosion by slag depleted in $Fe_2O_3$* Degree of wear (%) | −10 | −10 |
| | Corrosion by slag rich in $Fe_2O_3$** Degree of wear (%) | −52 | −22 |
| | Thermal stability*** Loss in weight (%) | −13.5 | −7.2 |

Corrosion resistance test using the rotary fingers dynamic method
*1600° C./4 h/argon — slag: $SiO_2 = 36.7\%$ − $Al_2O_3 = 11.6\%$ − $Fe_2O_3 = 1.9\%$ − CaO = 39.8% − MgO = 6.95% − $TiO_2 = 0.6\%$ − $Na_2O + K_2O = 0.75\%$
**1525° C./4 h/aron — slag: $SiO_2 = 20\%$ − $Al_2O_3 = 12.5\%$ − $Fe_2O_3 = 25\%$ − $TiO_2 = 0.7\%$ − CaO = 35% − MgO = 4% − $Na_2O + K_2O = 1.2\%$
***Loss in weight after re-firing at 1750° C. for 5 hours under argon.

It is seen that sample B, which has a higher value for the index z than does sample A, has a better resistance to corrosion by a slag rich in $Fe_2O_3$ and a higher thermal stability. It also appears that, under the industrial production conditions described, the addition of aluminium powder to the mixture is necessary in order to obtain a binding matrix consisting of a sialon having a high value of z.

EXAMPLE 3

This example illustrates the production of refractory materials C, D and E from three granulates other than corundum. The method was that of Example 1.

The granulates used were as follows:

"Spinel" is a fused $MgO-Al_2O_3$ spinel corresponding to the following analysis by weight: $Al_2O_3 = 70\%$ — MgO = 29% — $SiO_2 = 0.6\%$ — $Fe_2O_3 = 0.4\%$ "ER 1681" is an electro-fused mullitezirconia grain marketed by the Société Européenne des Produits Réfractaires, 84131 Le Pontet, France, and having the folloiwng analysis by weight: $Al_2O_3 = 50.6\%$ -$ZrO_2 = 32.5\%$ -$SiO_2 = 15.6\%$ -$Na_2O = 1.1\%$- others 0.2%.

"ER 5312" is an electro-fused corundum-spinel grain marketed by the Société Européenne des Produits Réfractaires, 84131 Le Pontet, France, and having the following analysis: $Al_2O_3 = 87.5\%$ —$MgO = 7\%$-$Na_2O = 4.5\%$ —$SiO_2 = 1\%$.

Table 3 below lists the starting ingredients and the main properties of the material obtained, including the proportion of binding matrix and its composition.

TABLE 3

| | Material | C | D | E |
|---|---|---|---|---|
| Starting Ingredients | Spinel (3-1 mm) | 35 | — | — |
| | Spinel (<1 mm) | 36 | — | — |
| | ER 5312 (3-1 mm) | — | 35 | — |
| | ER 5312 (<1 mm) | — | 36 | — |
| | ER 1681 (2-0.5 mm) | — | — | 46 |
| | ER 1681 (0.5-0.1 mm) | — | — | 25 |
| | Aluminium 200 TV | 5 | 5 | 5 |
| | Silicon T.140 | 11 | 11 | 11 |
| | Calcined fine alumina | 10 | 10 | 10 |
| | Ground clay | 3 | 3 | 3 |
| | Dextrin powder | +0.5 | +0.5 | +0.5 |
| | Water | +2 | +2 | +2 |
| Properties | Density | 2.98 | 2.74 | 3.00 |
| | Cold flexural strength (MPa) | 28 | 20.2 | 31.8 |
| | Flexural strength at 1500° C. (MPa) | 27 | 19 | 4 |
| | Resistance to thermal shock as determined by the reduction in the flexural strength after quenching (%) | −60 | −40 | −43 |
| | Proportion of binding matrix* | 32 | 34 | 32 |

*essentially formed of a sialon having a z value of 3. Sample C contained traces of the AlN 15R polytype.

We claim:

1. An article for use in regulating or interrupting a jet of molten steel, wherein said article includes a molten steel contact surface of a refractory material consisting essentially of
   a) 61 to 77% by weight of grains selected from the group consisting of corundum grains, spinel grains, mullite-zirconia grains and corundum-spinel grains, said grains containing at least 50% by weight of alumina and having a melting point higher than 1800° C., and
   b) 39 to 23% by weight of a binding phase comprised of not less than 90% by weight of a sialon of the formula $Si_{6-z}Al_zO_zN_{8-z}$ wherein z ranges from 2.5 to 4, the remaining part of the binding phase comprising one or more minor constituents selected for the group consisting of silicon nitride, silicon oxynitride, nitrogen-containing mullite of composition $Al_6Si_6N_8O_9$ and the 15 R polytype of aluminum nitride.

2. The article according to claim 1, in which the grains have an alumina content higher than 70% by weight.

3. The article according to claim 1, in which the grains have an alumina content higher than 90% by weight.

4. The article according to claim 3, in which the grains are corundum particles.

5. The article according to claim 1, in which z ranges from 2.5 to 3.5.

6. The article according to claim 1, obtained by mixing the following constituents in the indicated proportions in % by weight:
   a) 70 to 80% of grains selected from the group consisting of corundum grains, spinel grains, mullite-zirconia grains and corundum-spinel grains, and at least 90% of the particles of which are between 5 mm and 20 μm,
   b) 20 to 30% of a mixture of reactive powders comprising:
      (i) 35 to 45% of silicon powder, at least 90% of the particles of which have a diameter smaller than 150 μm;
      (ii) 38 to 50% of calcined alumina, at least 90% of the particles of which have a diameter smaller than 20 μm;
      (iii) 12 to 20% of aluminum powder, at least 90% of the particles of which have a diameter smaller than 80 μm, the sum of the constituents (i) to (iii) representing 100%,
   c) 0 to 3% of a dried and ground refractory clay, the sum of the ingredients (a) to (c) representing 100%, and
   d) a small amount of a temporary binder; forming the resulting mixture into the desired shape by pressing, drying the resulting part and firing it under nitrogen at a temperature of 1300° to 1600° C.

7. The article according to claim 6, in which the grain (a) has an alumina content higher than 90% by weight.

8. The article according to claim 1, which is a fixed or mobile plate for a slide closing device.

9. The article according to claim 1, which is a seating brick, an internal nozzle or a collecting nozzle of a slide closing device, or a calibrated nozzle.

10. The article according to claim 1, which is a component of a plug and nozzle system.

* * * * *